(12) United States Patent
Cho (10) Patent No.: US 10,025,730 B2
(45) Date of Patent: Jul. 17, 2018

(54) REGISTER DEVICE AND METHOD FOR SOFTWARE PROGRAMMING

(71) Applicant: Samsung Electronics Co., Ltd., Gyeonggi-do (KR)

(72) Inventor: Heumpil Cho, Seoul (KR)

(73) Assignee: Samsung Electronics Co., Ltd (KR)

( * ) Notice: Subject to any disclaimer, the term of this patent is extended or adjusted under 35 U.S.C. 154(b) by 203 days.

(21) Appl. No.: 14/931,470

(22) Filed: Nov. 3, 2015

(65) Prior Publication Data

US 2016/0224478 A1 Aug. 4, 2016

(30) Foreign Application Priority Data

Feb. 3, 2015 (KR) .................... 10-2015-0016774

(51) Int. Cl.
*G06F 13/16* (2006.01)
*G06F 1/32* (2006.01)
(Continued)

(52) U.S. Cl.
CPC ............ *G06F 13/16* (2013.01); *G06F 1/32* (2013.01); *G06F 3/061* (2013.01); *G06F 3/065* (2013.01);
(Continued)

(58) Field of Classification Search
CPC ... G06F 5/06; G06F 5/065; G06F 5/08; G06F 9/30098; G06F 9/30105; G06F 9/3012;
(Continued)

(56) References Cited

U.S. PATENT DOCUMENTS

| 5,682,157 A | 10/1997 | Asmussen et al. |
| 5,802,104 A | 9/1998 | Thomas |

(Continued)

FOREIGN PATENT DOCUMENTS

| JP | 2004334930 A | 11/2004 |
| KR | 20040006728 A | 1/2004 |

(Continued)

OTHER PUBLICATIONS

Carvajal, Gonzalo et al. "Evaluation of Communication Architectures for Switched Real-Time Ethernet". IEEE Transactions on Computers. vol. 63, No. 1. Jan. 2014. IEEE. pp. 218-229.*

(Continued)

*Primary Examiner* — Thomas J Cleary
(74) *Attorney, Agent, or Firm* — The Farrell Law Firm, P.C.

(57) ABSTRACT

A communication device is provided. The communication device includes a master interface unit that is configured to provide an interface between a processor and a register device of the communication device, a slave interface unit that is configured to provide an interface between a hardware block and the register device, a first register that is configured to store real time processed data using the master interface unit, the first register being in operable bilateral communication with the slave interface unit, and a second register that is configured to store real time processed data using the master interface unit, the second register being in operable unilateral communication with the slave interface unit.

14 Claims, 11 Drawing Sheets

(51) Int. Cl.
  *G06F 3/06* (2006.01)
  *G06F 13/40* (2006.01)
(52) U.S. Cl.
  CPC ........ *G06F 3/0683* (2013.01); *G06F 13/4068* (2013.01); *Y02D 10/14* (2018.01); *Y02D 10/151* (2018.01)
(58) Field of Classification Search
  CPC ........ G06F 9/3013; G06F 13/14; G06F 13/38; G06F 13/40; G06F 13/4004; G06F 13/4027; G06F 13/16; G06F 1/32; G06F 3/065; G06F 3/061; G06F 3/0683; G06F 13/4068
  See application file for complete search history.

(56) References Cited

U.S. PATENT DOCUMENTS

| | | | |
|---|---|---|---|
| 6,075,772 A * | 6/2000 | Brown | H04L 47/10 370/235 |
| 6,262,805 B1 | 7/2001 | Ishikawa et al. | |
| 6,480,068 B1 | 11/2002 | Mujica et al. | |
| 2008/0313589 A1* | 12/2008 | Maixner | G06F 17/5027 716/113 |
| 2011/0296078 A1 | 12/2011 | Khan et al. | |
| 2014/0140381 A1* | 5/2014 | Sang | H04B 1/406 375/219 |

FOREIGN PATENT DOCUMENTS

| | | |
|---|---|---|
| KR | 100742839 B1 | 7/2007 |
| KR | 101233168 | 7/2013 |

OTHER PUBLICATIONS

"Bilateral." Merriam-Webster.com. Merriam-Webster. Retrieved from Internet Jul. 20, 2017. <https://www.merriam-webster.com/dictionary/bilateral>.*

"Unilateral." Merriam-Webster.com. Merriam-Webster. Retrieved from Internet Jul. 20, 2017. <https://www.merriam-webster.com/dictionary/unilateral>.*

* cited by examiner

REGISTER DEVICE AND METHOD FOR SOFTWARE PROGRAMMING

PRIORITY

This application claims priority under 35 U.S.C. § 119(a) to Korean Application Serial No. 10-2015-0016774, which was filed in the Korean Intellectual Property Office on Feb. 3, 2015, the entire content of which is incorporated herein by reference.

BACKGROUND

1. Field of the Disclosure

The present disclosure relates generally to a register device and method, and more particularly, to a register device that uses a first register including a first type of memory and second register including a second type of memory.

2. Description of the Related Art

Conventional wireless electronic devices are configured using a flip-flop (e.g., as a storage device), without the distinction of real time and non-real time processing, in transferring various parameter values to components of the electronic device.

Figure 1:
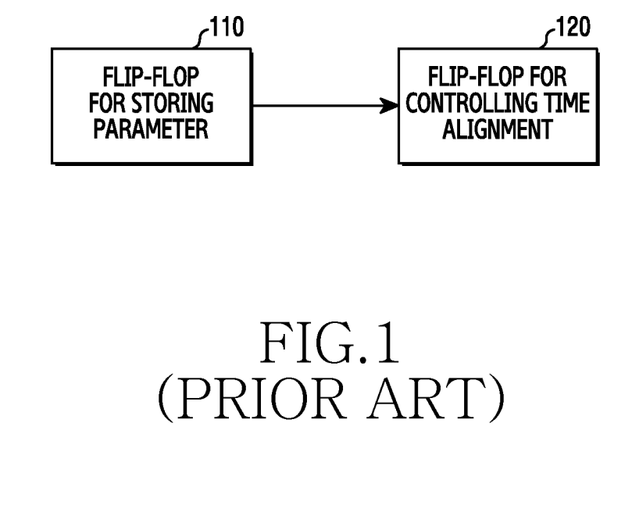
FIG. 1 is a diagram illustrating a conventional register that may be a component of a wireless electronic communication device.

FIG. 1 illustrates a conventional register that may be included in a wireless electronic communication device. Referring to FIG. 1, the register includes a flip-flop 110 for storing a parameter of the electronic device and a flip-flop 120 for controlling a timing alignment. The register, since it is configured using only a flip-flop, takes up a relatively large area in the electronic communication device and consumes a relatively large amount of power.

SUMMARY

The present disclosure has been made to address at least the above mentioned problems and/or disadvantages and to provide at least the advantages described below.

An aspect of the present disclosure provides a device and method of controlling a register, thereby reducing an area of a register and power consumption.

In accordance with an aspect of the present disclosure, there is provided a communication device. The communication device includes a master interface unit that is configured to provide an interface between a processor and a register device of the communication device, a slave interface unit that is configured to provide an interface between a hardware block and the register device, a first register that is configured to store real time processed data using the master interface unit, the first register being in operable bilateral communication with the slave interface unit, and a second register that is configured to store real time processed data using the master interface unit, the second register being in operable unilateral communication with the slave interface unit.

In accordance with an aspect of the present disclosure, there is provided a method of communicating data between components of a register device. The method includes providing an interface between a processor and the register device using a master interface unit, providing an interface between a hardware block and the register device using a slave interface unit, storing, by a first register, data processed in real time by the master interface unit, storing, by a second register, data processed in non-real time by the master interface unit, and accessing the first register and the second register using the slave interface, wherein the first register is in bilateral communication with the slave interface unit and the second register is in unilateral communication with the slave interface unit.

In accordance with an aspect of the present disclosure, there is provided a System on Chip (SoC) for use with a register device. The SoC includes a first register that is configured to store real time processed data using a master interface unit, the first register being in operable bilateral communication with a slave interface unit, and a second register that is configured to store real time processed data using the master interface unit, the second register being in operable unilateral communication with the slave interface unit.

In accordance with an aspect of the present disclosure, there is provided an electronic device that uses a register including a first register having a first type memory and a second register having a second type of memory. The second register is connected to a slave read/write interface unit that is configured to control data transfer between the first register and the second register based on a timing sequence.

BRIEF DESCRIPTION OF THE DRAWINGS

The above and other aspects, features, and advantages of the present disclosure will be more apparent from the following detailed description, taken in conjunction with the accompanying drawings, in which.

DETAILED DESCRIPTION

Hereinafter, embodiments of the present disclosure will be described in detail with reference to the accompanying drawings. A detailed description of known functions and configurations incorporated herein will be omitted for clarity.

Hereinafter, the present disclosure describes techniques for register control. The following electronic device includes a transmitting and receiving device including a modem.

Figure 2:
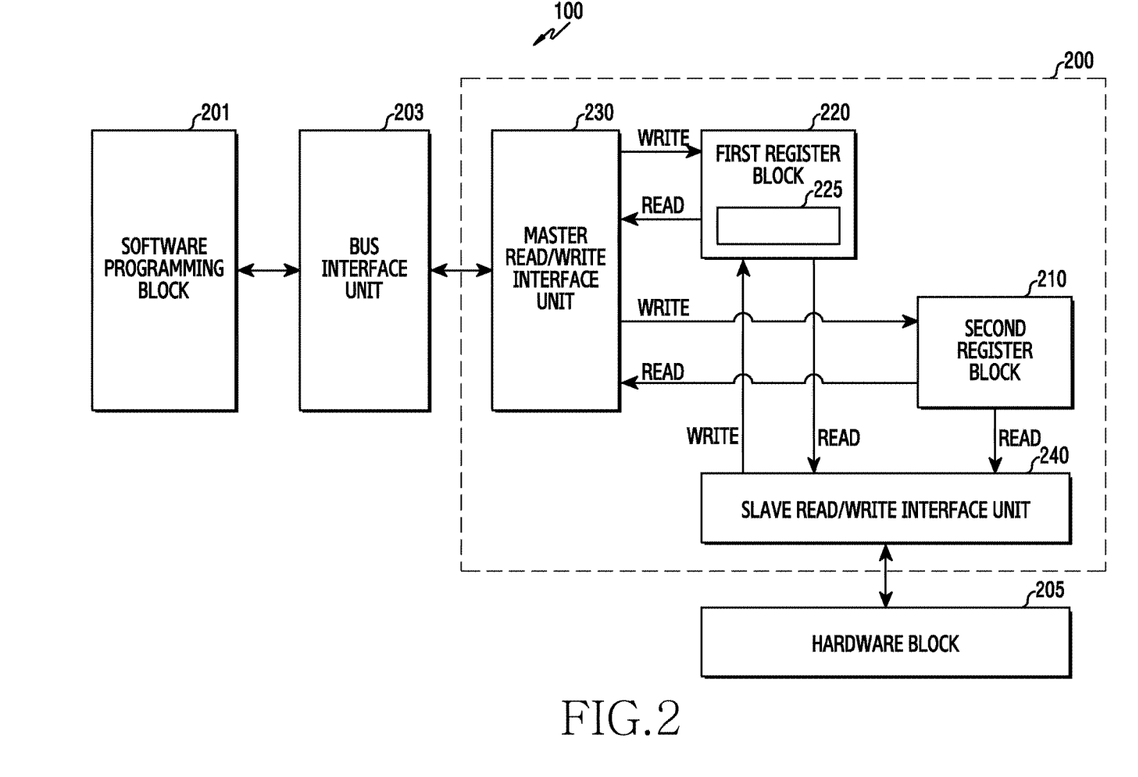
FIG. 2 is a diagram illustrating an electronic device for data access, according to an embodiment of the present disclosure.

FIG. 2 is a diagram illustrating a configuration of an electronic device 100, e.g., a wireless electronic communication device, for data access, according to an embodiment of the present disclosure.

Referring to FIG. 2, the electronic device 100 includes a software programming block 201, a bus interface unit 203, a hardware block 205, and a register block 200, which includes a first register block 220, a second register block 210, a master interface 230, and a slave interface 240, which is in bilateral communication with the first register block 220 and is in unilateral communication with the second register block 210.

The first register block 220 uses a flip-flop for real time processing, and the second register block 210 uses a memory for non-real time processing. That is, the register block 220 distinguishes between real time processing and non-real time processing, depending on a type of requested data access.

The electronic device 100 is implemented using software (SW) that is executed using a general purpose Central Processing Unit (CPU) or a specialized Digital Signal Processor (DSP), and the like. However, since the electronic device 100 can consume large amounts of power or radiate excessive heat if implemented with only the CPU and the DSP, an additional hardware (HW) block may be used for processing large amounts of data, e.g., data that is specialized for wireless communication. In this case, transmission of all sorts of commands and parameters necessary for executing the commands is required from a block that is responsible for software programming, such as the CPU or the DSP to a hardware block; a register block is responsible for the transmission of data between the CPU/DSP and the hardware block. In this regard, various general-use bus interfaces can be used and the master read/write interface unit 230 is responsible for the various processes between the CPU/DSP and the hardware block.

The software programming blocks 201, if necessary, conveys data (including a command and parameter), which has a unit size (corresponding to a first type of memory width), to be written on the register block at any time point in line with an approximate hardware timing, which is managed by software A portion of the data that has to be transmitted at a certain time point in line with hardware timing corresponds to non-real time processing and a portion of the data that defines a criteria for non-real time processing, or another portion of the data that has to be transmitted immediately regardless of the hardware timing, corresponds to real time processing. For real time processing, the first register block 220 is used and for the non-real time processing, the second register block is used. When transmitting data from the hardware block to the software programming block, data transmission through the first register block 220 is needed for real time processing. Therefore, in the case of the first register block 220, the write operation to the register block is added through the slave read/write interface unit 240 in the hardware block 205. The first register block 220 includes a flip-flop 225 for storing parameters. The flip-flop 225 stores data (including a command and parameter) that has the unit size (corresponding to the first type of memory width).

Figure 3:
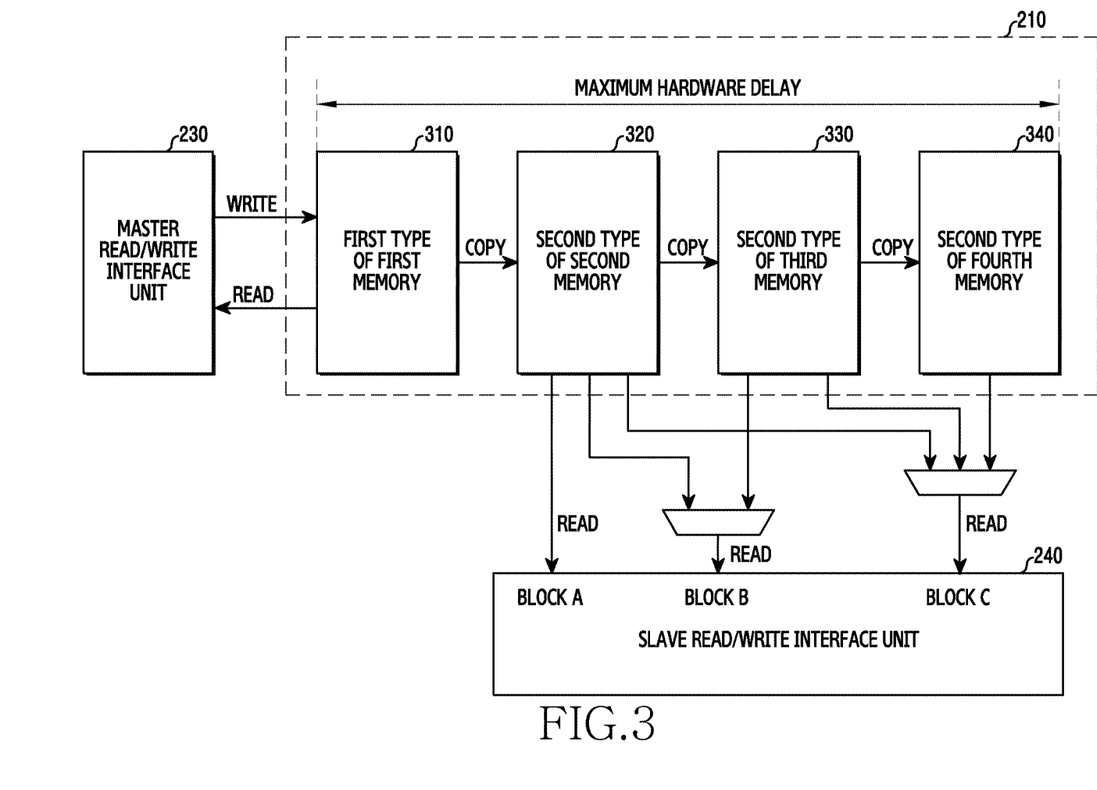
FIG. 3 is a diagram illustrating the register and data access associated therewith, according to an embodiment of the present disclosure.

FIG. 3 is a diagram illustrating a register e and data access associated therewith, according to an embodiment of the present disclosure.

Referring to FIG. 3, the second register block 210 includes a first type of a first memory 310, a second type of second to fourth memories 320, 330, and 340. The numbers of the first and second types of memories 310, 320, 330, and 340 may be subject to change depending on the status of the system, and the number of the first memory 310 and the second type of memories 320, 330, and 340 may correspond to a maximum delay unit timing tick (or position) of the hardware block.

Referring to FIG. 3, the master read/write interface unit 230 controls the first memory 310, and the slave read/write interface unit 240 controls the second type of memories 320, 330, and 340.

The first memory 310 can be set to a memory width, which corresponds to a unit size to be accessed by software, and the second type of memories 320, 330, and 340 can be set to an integer n multiple of the memory 310. Specifically, the size of the second type of memories 320, 330, 340 can be set to the size of an integer n that is multiplied by the number of the blocks present in the slave read/write interface unit 240. For example, when a size of the first memory 310 is 32 bits, and the slave read/write interface unit 240 includes three blocks of A, B, and C, the size of the second type of memories 320, 330, and 340 may be 96 bits, e.g., 32 bits multiplied by the number of the blocks (three).

Setting the size of the second type of memories 320, 330, and 340, as described above, when a plurality of blocks has requested access simultaneously, enables each block to read a plurality of data at a time, thereby securing the same throughput for each block. As in the above example, when the second type of memories 320, 330, and 340 have the same size as the first memory 310, a request for simultaneous access from each block of the slave read/write interface unit 240 may result in an access rate of 1/3 when compared to an access rate when the request for access is consecutive. In order to solve this problem, three consecutive addresses of the first memory 310 are collected and stored in one of the address of the second type of memories 320, 330, and 340. Therefore, the height of the memory can be reduced to one third, the width of the memory can be tripled, and three units of data can be read at a time, which can result in a tripled access rate. When the length of the memory is set as described above, data moves from the first memory 310 to the second type of memories 320, 330, and 340, and data is copied at a time after being collected by an increased width; buffering may be required in the meantime.

Figure 4:
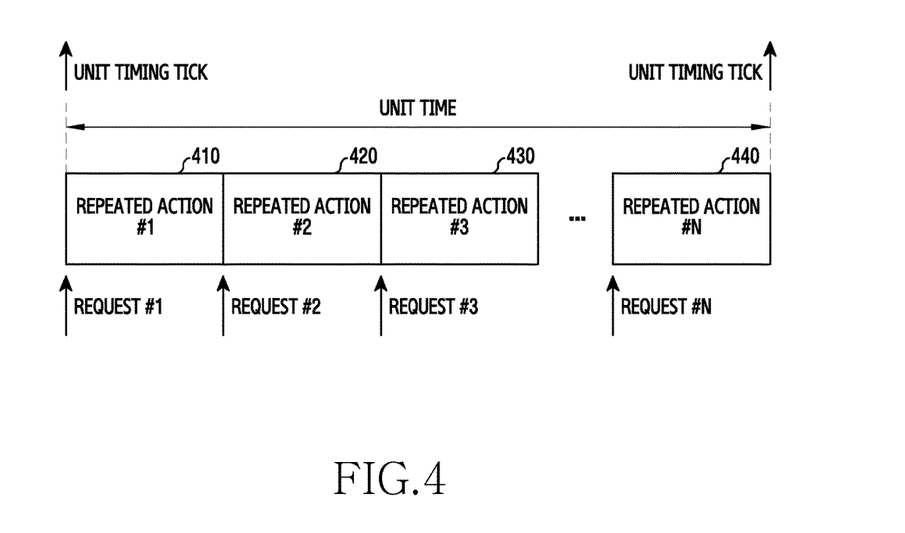
FIG. 4 is a diagram illustrating repeated actions within a unit delay time, according to an embodiment of the present disclosure.

FIG. 4 is a diagram illustrating repeated actions within the unit delay time, according to an embodiment of the present disclosure.

The values of the parameter read through the slave read/write interface unit 240 are stored in a flip-flop for controlling time alignment in order to be referenced in a block while in use. When there are N numbers of repeated actions 410, 420, 430, and 440, e.g., the unit time, a data access request corresponding to each repeated action may exist. In the case of the repeated actions 410, 420, 430, and 440, respective separate areas exist in the memory. Since an increased area and power consumption may arise when the numbers of the flip-flops are increased, in response to the number corresponding to that the repeated actions 410, 420, 430, and 440 are present in its respective memory area, only one set of flip-flop is used.

Figure 5:
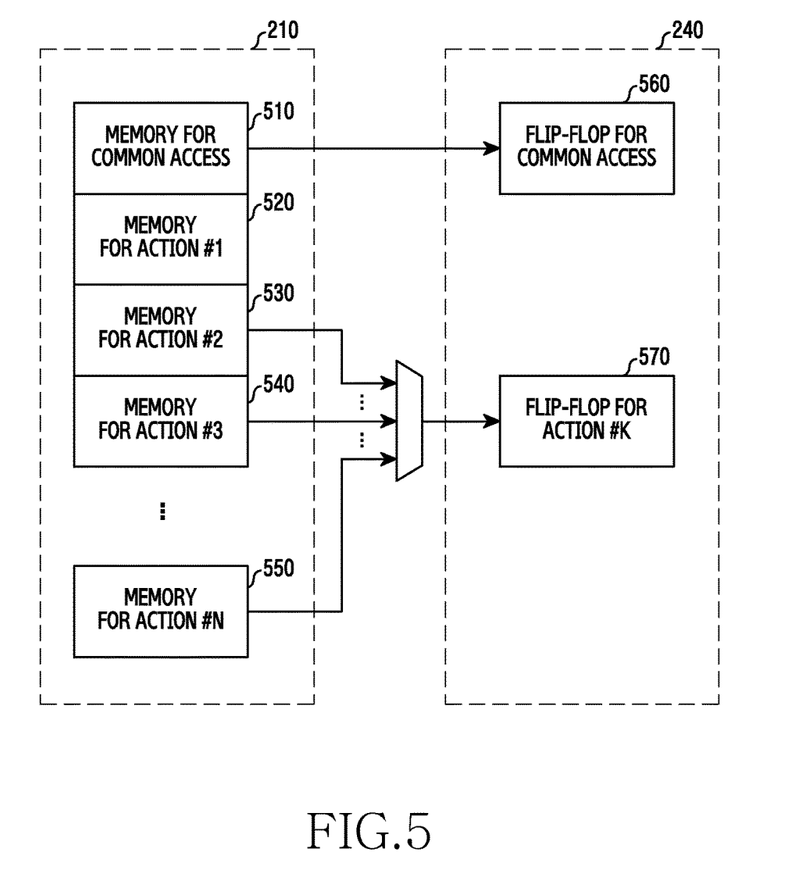
FIG. 5 is a diagram illustrating a memory device and a flip-flop device, according to an embodiment of the present disclosure.

FIG. 5 is a diagram illustrating a memory device and a flip-flop device, according to an embodiment of the present disclosure.

The memories of the FIG. 5 are for storing the parameters, and the memories are contained in the second register block 210. The memories include a memory 510 for common access and N number of memories 520, 530, 540, and 550 for actions. The areas of the memories 510 to 550, when selected from one of the memories of the first memory 310 and the second type of the fourth memory 340 of the FIG. 3, indicates a portion of the interior of the selected memory. The memories 510 to 550 displays the area corresponding to the particular block (block A or block B or block C) of the slave read/write interface unit 240. For example, the areas of the memories 510 to 550 may be included in proportion to the number of blocks in the first memory 310 of the second register block 210. The flip-flop for controlling time alignment is included in the slave read/write interface and may include the flip-flop 560 for common access, and the flip-flop 570 for $k^{th}$ action.

When the values of the parameter read through the slave read/write interface are to be stored in the flip-flop for controlling timing alignment, in order to be referenced in the blocks while in use, data of memory 510 for common use is stored separately in the flip-flop 560 for common access. Such a block of repeating action can be used to reduce the number of flip-flops to only one flip-flop, and upon receipt of the repeat request, the only value that is used in the current action can be moved from memories 520, 530, 540 and 550 to the flip-flop 570.

When the N numbers of repeated actions are present, i.e., the unit time, the number of flip-flops may be required by 1/N out of the total number of parameters.

Figure 6:
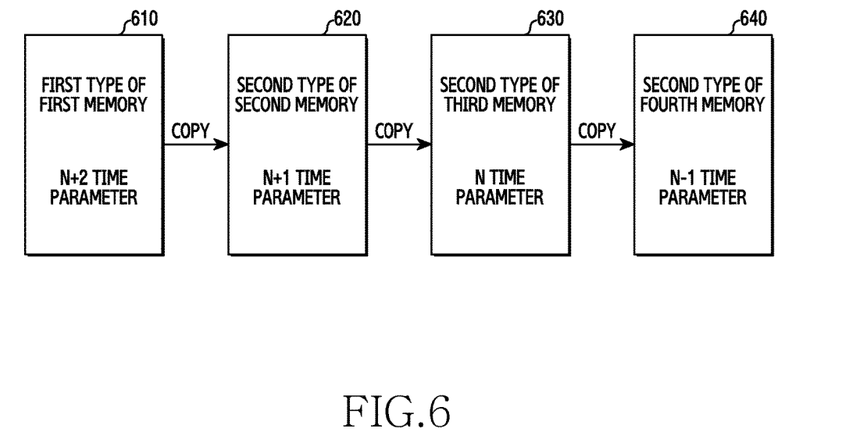
FIG. 6 is a diagram illustrating a parameter value corresponding to the memory, according to the embodiment of the present disclosure.

FIG. 6 is a diagram illustrating the value of a parameter corresponding to the memory, according to the embodiment of the present disclosure.

Different action timing can be identified for each memory. The access time point of the software programming block 201 is advanced by the unit delay time of the access time point of the hardware blocks 205. The hardware block 205 may use the parameter value for the software programming at different time points, due to hardware delay for each block included therein. A difference between time points of memory access of the register block is due to the reference timing difference from each block.

With regard to copying data between the memories, copying to the second type of the fourth memory 640 having the maximum delay unit timing tick is performed first. That is, copying is performed in a sequence from the second type of the third memory 630 to the second type of the fourth memory 640, and the second type of the third memory 630, and to the second type of the second memory 620.

Figure 7:
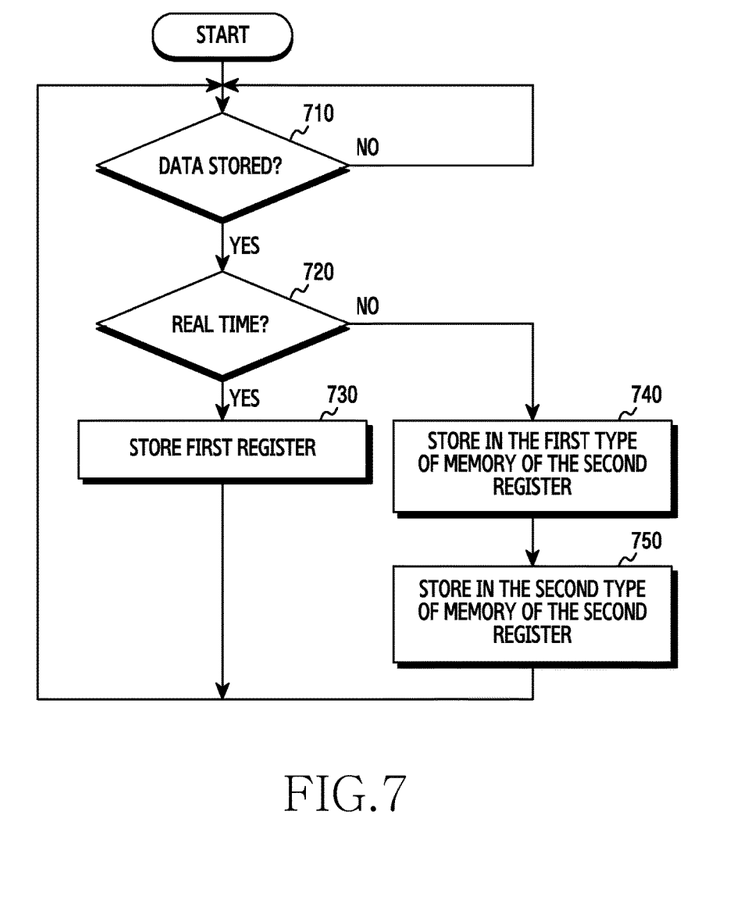
FIG. 7 is a flowchart illustrating a control method for data storing by a register device, according to an embodiment of the present disclosure.

FIG. 7 is a flowchart illustrating a control method for data storing by the register device 200, according to an embodiment of the present disclosure.

In step 710, the register device 200 identifies whether a signal for storing data is received. If the register identifies the signal for storing data, the register device proceeds to step 720, and then identifies whether the received signal is a storage signal for real time access. If the signal is identified as the storage signal for real time access, the register device 200 proceeds to step 730, and then stores information for real time access in the first register block 220.

If it is identified that the storage signal is not the storage signal for real time access, that is, if the signal corresponds to a non-real time storage signal, the register device 200 proceeds to step 740, and then stores the information in the first type of memory 310 of the second register block 210. When there is a request for slave interface, the stored data is copied and stored in the second type of memory (e.g., one of the second memories 320, 330, and 340) of the second register block 210.

Figure 8:
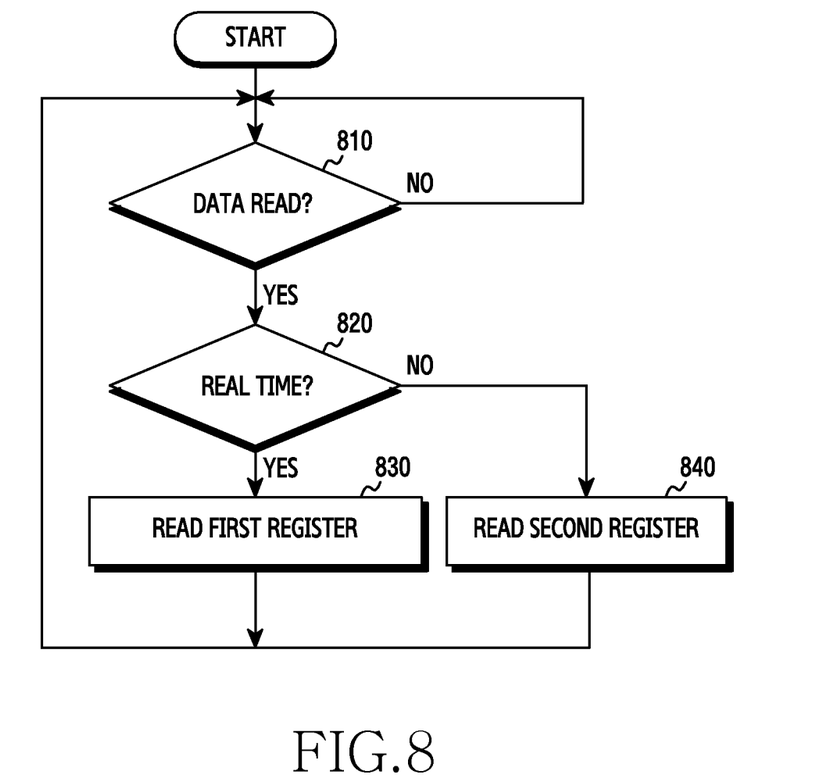
FIG. 8 is a flowchart illustrating a control method for data reading by a register device, according to an embodiment of the present disclosure.

FIG. 8 is a flowchart illustrating a control method for data reading by the register device 200, according to an embodiment of the present disclosure.

In step 810, the register device 200 identifies whether there is a data read signal. If there is no data read signal, the register device 200 waits until the data read signal is identified. If there is a data read signal, the register device 200 proceeds to step 820, and then identifies whether the read signal is a real time signal. If the signal is a real time signal, the register device 200 proceeds to step 830 to read from the first register block 220, and if there is no real time signal, that is, the signal is a non-real time signal, the register device 200 proceeds to step 840 to read from the second register. When reading from the second register, the register device 200 reads while changing the memory, depending on the requests of each block of the slave read/write interface unit 240.

Each of the data storing process and read control process of the FIGS. 7 and 8 can be performed separately, and the processes of the FIGS. 7 and 8 may also be performed simultaneously.

Figure 9:
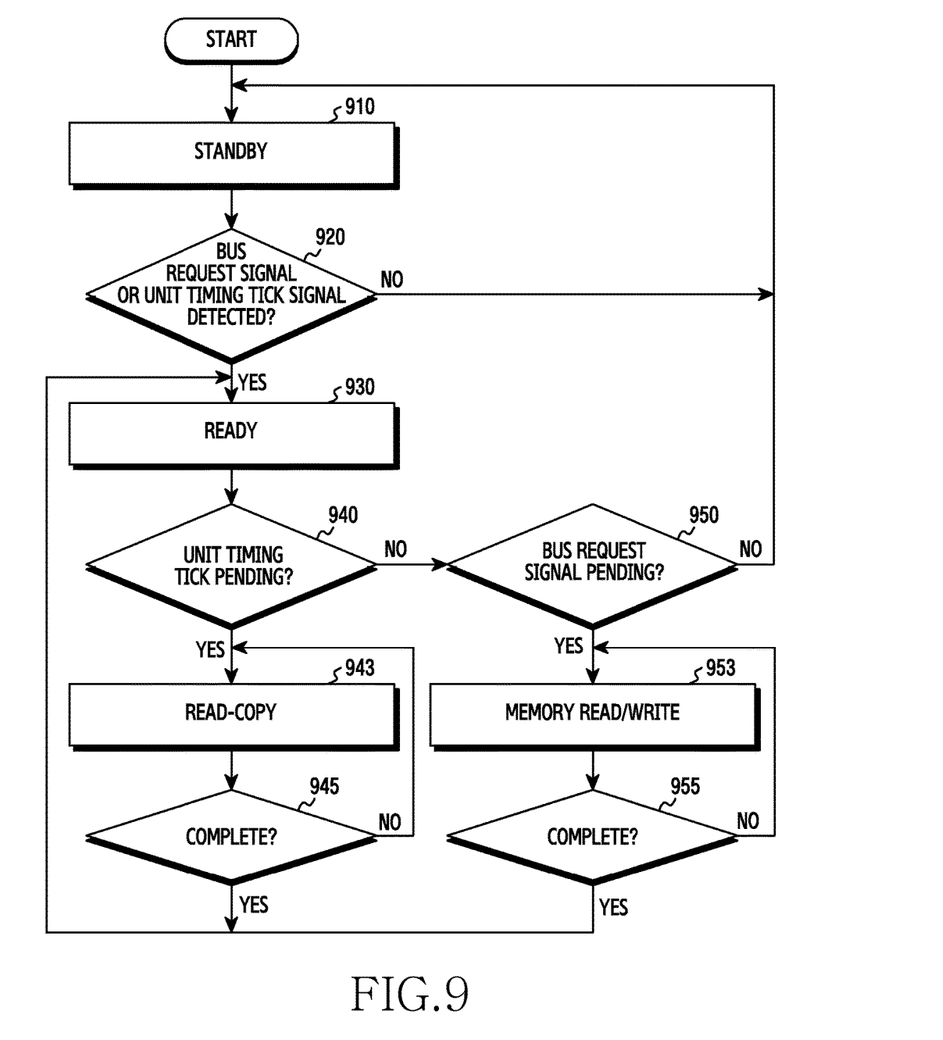
FIG. 9 is a flowchart illustrating a control method of a first type of memory, according to an embodiment of the present disclosure.

FIG. 9 is a flowchart illustrating a control method of the first type of memory 310, according to an embodiment of the present disclosure.

The first type of memory 310 can be controlled by the master read/write interface unit 230. In step 910, the master read/write interface unit 230 operates in an idle mode and then, in step 920, the master read/write interface unit 230 identifies whether a bus request signal or a unit timing tick signal is detected. If the signal is not detected, the master read/write interface unit 230 continues operating in the idle mode, and when the signal is detected, the master read/write interface unit 230 operates in a preparation mode, in step 930. When the master read/write interface unit 230, which has been operating in the preparation mode, identifies the pending of the unit timing tick signal, and in step 904, the master read/write interface unit 230 reads from the first memory, and then copies what was read from the first memory to the second memory, in step 943. The unit timing tick signal refers to a signal with respect to timing at which the copy is being performed, and is made periodically. Thereafter, in step 945, the master read/write interface unit 230, upon completion of the read-copy to the buffer, returns to the preparation mode 930, otherwise, in step 943, performs the read-copy again.

In step 940, when the master read/write interface unit 230 has not identified that the unit timing tick signal is pending, the master read/write interface unit 230 proceeds to the step 950 to identify a bus request signal. The bus request signal refers to a signal requested by software. When the bus request signal is identified, the master read/write interface unit 230, in step 953, performs read and write operations of the memory. Thereafter, in step 955, the master read/write interface unit 230, upon completing the read and write to the buffer, returns to the preparation mode 930 to operate in the preparation mode, otherwise, in step 953, performs the read and write operations of the memory again.

Figure 10:
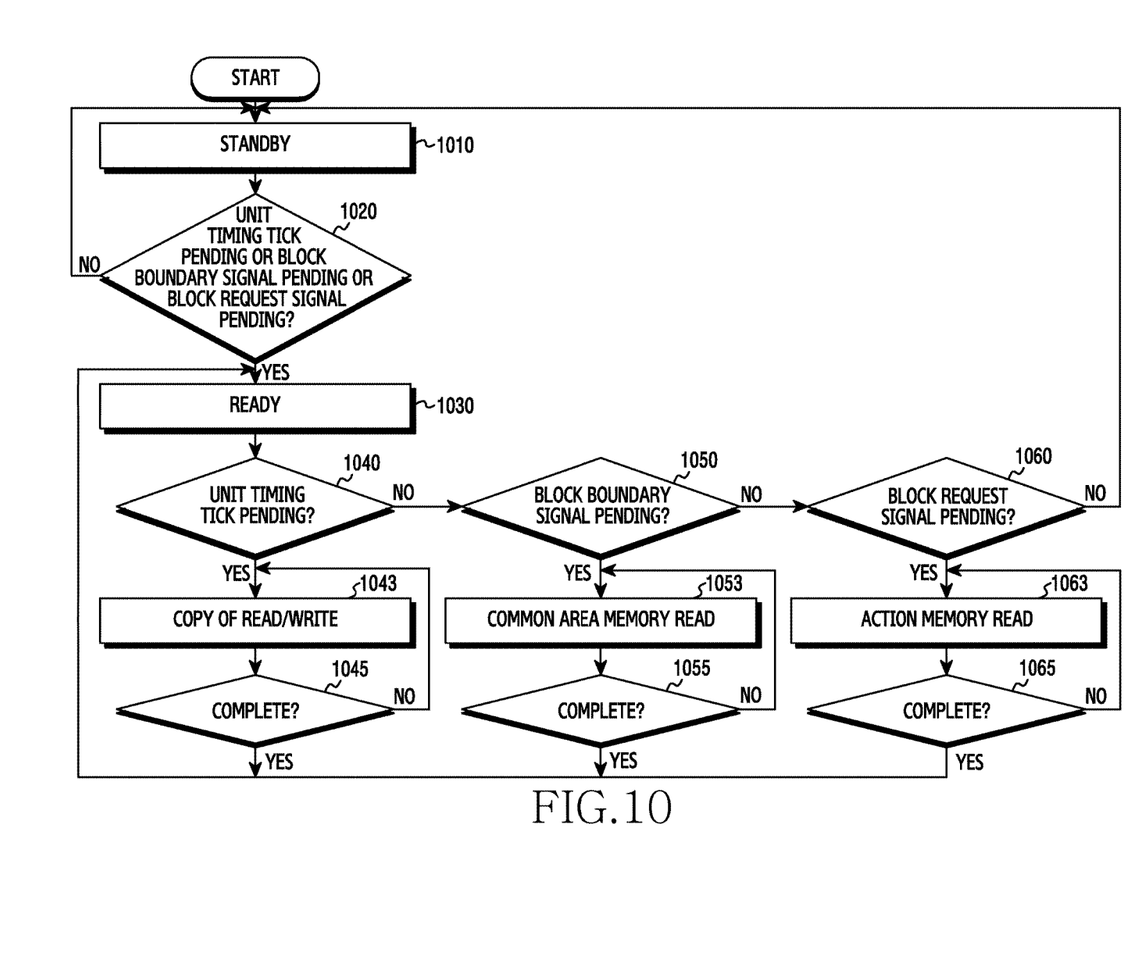
FIG. 10 is a flowchart illustrating a control method of a second type of memory, according to an embodiment of the present disclosure.

FIG. 10 is a flowchart illustrating a control process of the second type of memory, according to an embodiment of the present disclosure.

The second type of memories 320, 330, and 340 can be controlled by a slave read/write interface unit 240. In step

1010, when the slave read/write interface unit 240, which has been operating in a standby mode or an idle mode, and the slave read/write interface unit 240 identifies whether a unit timing tick or a block boundary signal or a block request signal is detected. If the signal is not detected, the slave read/write interface unit 240 continues operating in the idle mode, and when the signal is detected, the slave read/write interface unit 240 operates in a preparation mode, in step 1030. The slave read/write interface unit 240, which has been operating in the preparation mode, and the slave read/write interface unit 240 identifies whether the timing tick is pending, in step 1040. If the pending of the unit timing tick is identified, the slave read/write interface unit 240 performs the read-copy or write-copy in step 1043. Thereafter, in step 1045, the slave read/write interface unit 240, upon completion of the copy of read or write, returns to the preparation mode 1030 to operate in the preparation mode, otherwise, in step 1043, performs the copy of read or write again.

In step 1040, when the slave read/write interface unit 240 does not identify the pending of the unit timing tick signal, the slave read/write interface unit 240 proceeds to the step 1050 to identify a block boundary signal. When the block boundary signal is identified in step 1050, the slave read/write interface unit 240 reads the common area of memory in step 1053. Thereafter, in step 1055, the slave read/write interface unit 240, upon completion of the read of the common area of memory, returns to the preparation mode 1030 again to operate in the preparation mode, otherwise, in step 1053, performs read and write operations to the memory.

In step 1050, when the slave read/write interface unit 240 does not identify the pending of the block boundary signal, the slave read/write interface unit 240 proceeds to the step 1060 to identify the pending of the block request signal. When the pending of the block request signal is not identified, the slave read/write interface unit 240 proceeds to step 1010 to operate in the idle mode. When the pending of the block request signal is identified, the slave read/write interface unit 240 proceeds to step 1063, to read the action area of the memory. When the slave read/write interface unit 240, in step 1065, completes the reading of the action area of the memory, returns to the preparation mode 1030 again to operate in the preparation mode, otherwise, proceeds to step 1063, to read the action area of the memory.

Figure 11:
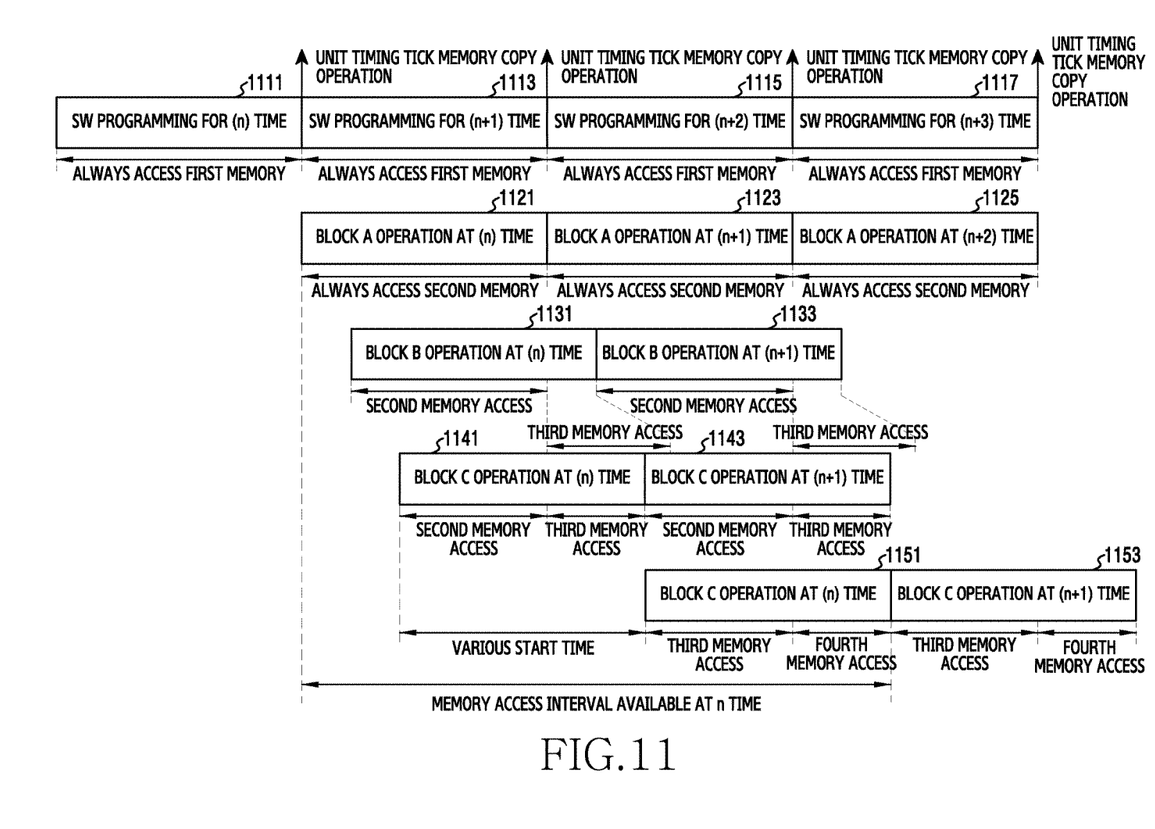
FIG. 11 is a diagram illustrating a type of memory access between blocks based on an operating time, according to an embodiment of the present disclosure.

FIG. 11 is a diagram illustrating a type of memory access between blocks based on operating time, according to an embodiment of the present disclosure.

It is assumed that an access from three blocks associated with the master read/write interface unit 230 and the slave read/write interface unit 240 is performed.

Since the access by the master read/write interface unit 230 is performed through the first type of the first memory 310, the master read/write interface unit 230 always accesses only the first memory 310. Since the timing of the access through the first memory 310 matches with the unit timing tick memory copy operation period, even if operating time has been elapsed, the master read/write interface unit 230 always performs access (indicated by reference numerals 1111, 1113, 1115 and 1117) through the first memory 310.

When the first block of the slave read/write interface unit 240 is referred to as a block A and the slave read/write interface unit 240 performs the access, it is assumed that a block which performs the first access from the slave read/write interface unit 240 is referred to as a block A, a block which performs next (or second) is referred to as a block B, and a block which performs next (or third) is referred to as a block C. When the block A of the slave read/write interface unit 240 performs access, since the timing of access through the block A matches with the unit timing tick memory, the access through the block A of the slave read/write interface unit 240 is performed through the second memory. Therefore, in this case, even if the operation time has been elapsed, the block A of the slave read/write interface unit 240 always performs access (indicated by reference numerals 1121, 1123 and 1125) through the second memory 320.

If the access is performed through the block B of the slave read/write interface unit 240, the access through the block B does not match with the copy timing of the unit timing tick memory. Therefore, when the unit timing tick memory copy operation is executed, the block B has to change the memory and then perform the access. With respect to the operation 1131 of the block B at n time, the block B, which has been performing access through the second memory 320, performs access through the third memory 330, which is the next memory to the second memory 320 when the unit timing tick memory copy operation is performed. The block B, which has been performing access through the second memory at n+1 time in the same way as the above, performs access (indicated by reference numeral 1133) through the third memory 330 when the timing tick copy operation is performed.

When the access is performed through the block C of the slave read/write interface unit 240, the access through the block C does not match with the copy timing of the unit timing tick memory. Therefore, when the unit timing tick memory copy operation is executed, the block C has to change the memory and then perform the access. With respect to the operation 1141 of the block C at n time, the block C, which has been performing access through the second memory 320, performs access through the third memory 330, which is the next memory to the second memory 320 when the unit timing tick memory copy operation is performed. The block C, which has been performing access through the second memory 320 at n+1 time in the same way as the above, performs access (indicated by reference numeral 1143) through the third memory 330.

Reference numerals 1151 and 1153 illustrate the memory access in a case of where the block C has various start times. In the block C's operation (indicated by reference numeral 1151) at n time, the block C, which has been performing access through the third memory 330, performs the access through the fourth memory 340 when the unit timing tick memory copy operation is performed. Similarly, the block C's operation (indicated by reference numeral 1153) at n+1 time, the block C, which has been performing access through the third memory 330, performs the access through the fourth memory 340 when the unit timing tick memory copy operation is performed.

The methods described for use with the electronic device 100 may be implemented by hardware, software, or a combination of hardware and software.

In the implementation of software, a non-transitory computer-readable storage medium for storing one or more programs (software modules) may be provided. The one or more programs stored in the non-transitory computer-readable storage medium may be configured for execution by one or more processors within the electronic device 100. The one or more programs include instructions that cause the electronic device 100 to perform the methods according to embodiments disclosed herein or in the appended claims.

The programs (software modules or software) may be stored in non-volatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or other type optical storage devices, or a magnetic cassette. Alternatively, any combination of some or all of the aforementioned memories may form a memory in which the program is stored. Further, a plurality of such memories may be included in the electronic device 100. Moreover, the register 100 and components associated therewith can be implemented on a System on Chip (SoC).

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device 100 via an external port. Further, a separate storage device on the communication network may access a portable electronic device.

In various specific embodiments of the present disclosure as described above, an element or elements included in the present disclosure are expressed in a singular form or plural form according to the presented specific embodiments. However, the singular form or plural form is selected for convenience of description suitable for the presented situation, and various embodiments of the present disclosure are not limited to a single element or multiple elements thereof. Further, either multiple elements expressed in the description may be configured into a single element or a single element in the description may be configured into multiple elements.

While the present disclosure has been shown and described with reference to certain embodiments thereof, it should be understood by those skilled in the art that many variations and modifications of the method and apparatus described herein will still fall within the spirit and scope of the present disclosure as defined in the appended claims and their equivalents.

What is claimed is:

1. A communication device comprising:
   a master interface unit configured to provide an interface between a processor and a register device of the communication device;
   a slave interface unit configured to provide an interface between a hardware block and the register device;
   a first register in the register device, configured to store real time processed data using the master interface unit, the first register accessible by the slave interface unit; and
   a second register in the register device, configured to store non-real time processed data using the master interface unit, the second register accessible by the slave interface unit,
   wherein the first register comprises a flip-flop, and the second register comprises at least one memory,
   wherein the at least one memory comprises:
      a first memory configured to store data for a first data access type and perform data access using the master interface unit; and
      at least one second memory configured to store data for a second data access type and perform data access using the slave interface unit,
   wherein a size of the first memory corresponds to a size of data access for the first register, and
   wherein a size of the at least one second memory is an integer multiple of the size of the first memory.

2. The communication device of claim 1, wherein the at least one second memory of the second register comprises a block area that stores common data and at least one action data, and
   wherein the slave interface unit comprises a first flip-flop that buffers the common data and a second flip-flop that buffers the at least one action data, and
   wherein the slave interface unit accesses the at least one action data of the block area based on an access request signal requested in a unit time and buffers the at least one action data in the second flip-flop.

3. The communication device of claim 2, wherein a number of the at least one memory corresponds to a maximum delay unit timing tick of the hardware block.

4. The communication device of claim 3, wherein the master interface unit stores data in the first memory of the second register in the unit time, and
   wherein the slave interface unit stores the data stored in the first memory in the at least one second memory with the second data access type in the unit time.

5. The communication device of claim 4, wherein the slave interface unit copies data of a previous memory into a next memory in the unit time, and
   wherein copying of data is performed in a sequence from the memory having the maximum delay unit timing tick to a memory having a minimum delay unit timing tick.

6. A method of communicating data for a register device comprising a first register and a second register, the method comprising:
   providing an interface between a processor and the register device using a master interface unit;
   providing an interface between a hardware block and the register device using a slave interface unit;
   storing, by the first register, real time processed data using the master interface unit; and
   storing, by the second register, non-real time processed data using the master interface unit,
   wherein the first register and the second register are accessible by the slave interface unit,
   wherein the first register comprises a flip-flop, and the second register comprises at least one memory,
   wherein the at least one memory comprises:
      a first memory configured to store data for a first data access type and perform data access using the master interface unit; and
      at least one second memory configured to store data for a second data access type and perform data access using the slave interface unit,
   wherein a size of the first memory corresponds to a size of data access for the first register, and
   wherein a size of the at least one second memory is an integer multiple of the size of the first memory.

7. The method of claim 6, wherein the at least one second memory of the second register comprises a block area that stores common data and at least one action data, and
   wherein the slave interface unit comprises a first flip-flop that buffers the common data and a second flip-flop that buffers the at least one action data, and
   wherein the slave interface unit accesses the at least one action data of the block area based on an access request signal requested in a unit time and buffers the at least one action data in the second flip-flop.

8. The method of claim 7, wherein a number of the at least one memory corresponds to a maximum delay unit timing tick of the hardware block.

9. The method of claim 8, wherein the master interface unit stores data in the first memory of the second register in the unit time.

10. The method of claim 9, further comprising storing the data stored in the first memory in the at least one second memory of the second register with the second data access type using the slave interface unit in the unit time.

11. The method of claim 10, further comprising:
copying data of a previous memory into a next memory in the unit time using the slave interface unit,
wherein copying is performed in a sequence from the memory having the maximum delay unit timing tick to a memory having a minimum delay unit timing tick.

12. A System on Chip (SoC) for use with a register device, the SoC comprising:
a first register configured to store real time processed data using a master interface unit providing an interface between a processor and the register device, the first register accessible by a slave interface unit providing an interface between a hardware block and the register device; and
a second register configured to store non-real time processed data using the master interface unit, the second register accessible by the slave interface unit,
wherein the first register comprises a flip-flop, and the second register comprises at least one memory,
wherein the at least one memory comprises:
a first memory configured to store data for a first data access type and perform data access using the master interface unit; and
at least one second memory configured to store data for a second data access type and perform data access using the slave interface unit,
wherein a size of the first memory corresponds to a size of data access for the first register, and
wherein a size of the at least one second memory is an integer multiple of the size of the first memory.

13. The SoC of claim 12, wherein the at least one second memory of the second register comprises a block area that stores common data and at least one action data, and
wherein the slave interface unit comprises a first flip-flop that buffers the common data and a second flip-flop that buffers the at least one action data, and
wherein the slave interface unit accesses the at least one action data of the block area based on an access request signal requested in a unit time and buffers the at least one action data in the second flip-flop.

14. The SoC of claim 13, wherein a number of the at least one memory corresponds to a maximum delay unit timing tick of the hardware block.

* * * * *